United States Patent
Pahl et al.

(10) Patent No.: US 7,879,420 B2
(45) Date of Patent: Feb. 1, 2011

(54) MULTI-LAYERED LINER, A MULTI-LAYERED PRODUCT WHICH INCLUDES THE RELEASE LINER AND A METHOD FOR MAKING THE RELEASE LINER

(75) Inventors: Timo Pahl, Lohja (FI); Hannu Kaasalainen, Lohja (FI); Anssi Pulkkinen, Virkkala (FI)

(73) Assignee: Loparex LLC, Willowbrook, IL (US)

( * ) Notice: Subject to any disclaimer, the term of this patent is extended or adjusted under 35 U.S.C. 154(b) by 0 days.

(21) Appl. No.: 12/150,250

(22) Filed: Apr. 25, 2008

(65) Prior Publication Data

US 2008/0233325 A1  Sep. 25, 2008

Related U.S. Application Data

(63) Continuation of application No. 11/035,808, filed on Jan. 14, 2005, now abandoned, which is a continuation of application No. PCT/FI02/00640, filed on Jul. 18, 2002.

(51) Int. Cl.
   *B32B 9/00*   (2006.01)
   *B32B 33/00*  (2006.01)
   *B32B 23/02*  (2006.01)
   *B32B 7/02*   (2006.01)
   *B32B 27/32*  (2006.01)
   *B32B 9/04*   (2006.01)
   *A61F 13/15*  (2006.01)

(52) U.S. Cl. ............. 428/41.7; 428/41.8; 428/192; 428/194; 428/446; 428/212; 428/219; 428/220

(58) Field of Classification Search ............... 428/41.7, 428/41.8, 192, 194, 446, 212, 219, 220
See application file for complete search history.

(56) References Cited

U.S. PATENT DOCUMENTS

| | | |
|---|---|---|
| 3,509,991 A | 5/1970 | Hurst |
| 4,287,255 A | 9/1981 | Wong et al. |
| 4,380,563 A | 4/1983 | Ayotte |
| 4,421,807 A | 12/1983 | Clausing et al. |
| 4,495,243 A | 1/1985 | Kishi |
| 4,609,589 A | 9/1986 | Hosoda et al. |

(Continued)

FOREIGN PATENT DOCUMENTS

EP   0315297   5/1989

(Continued)

OTHER PUBLICATIONS

International Search Report for PCTFI02/00640 dated Nov. 3, 2003.

*Primary Examiner*—Victor S Chang
(74) *Attorney, Agent, or Firm*—McDermott Will & Emery LLP

(57) ABSTRACT

The invention relates to a manufacturing substrate of sheet-like products. The substrate comprises a paper layer (9) having a first surface and a second surface, a barrier layer (10) formed on the first surface of the paper layer (9), and a release layer (11) formed on the barrier layer (10). On the second surface of the paper layer (9) there is a non-stick layer (12). The invention relates also to a manufacturing method of the above-mentioned substrate, and a rebuilding method of a production line.

14 Claims, 2 Drawing Sheets

U.S. PATENT DOCUMENTS

| | | |
|---|---|---|
| 4,936,938 A | 6/1990 | Simpson et al. |
| 5,658,629 A * | 8/1997 | Delcuve et al. ............ 428/41.3 |
| 5,690,528 A | 11/1997 | Kelley |
| 5,691,022 A | 11/1997 | Knauf |
| 2003/0215594 A1 | 11/2003 | Hamdar et al. |
| 2004/0101679 A1 | 5/2004 | Mertz et al. |

FOREIGN PATENT DOCUMENTS

| | | |
|---|---|---|
| GB | 1418997 | 12/1975 |
| GB | 2311236 | 9/1997 |

* cited by examiner

MULTI-LAYERED LINER, A MULTI-LAYERED PRODUCT WHICH INCLUDES THE RELEASE LINER AND A METHOD FOR MAKING THE RELEASE LINER

CROSS-REFERENCE TO RELATED APPLICATIONS

This application is a continuation of U.S. application Ser. No. 11/035,808, filed Jan. 14, 2005, now abandoned which application is a continuation of International Application No. PCT/FI2002/000640, filed Jul. 18, 2002, both of which are hereby incorporated herein by reference.

FEDERALLY SPONSORED RESEARCH OR DEVELOPMENT

Not Applicable.

TECHNICAL FIELD

The present invention relates to a multi-layered release liner or substrate, a multi-layered sheet-like product which includes the release liner and a method of manufacturing the release liner. The release liner or substrate comprises a paper layer having a first surface and a second surface, a barrier layer formed on the first surface of the paper layer, and a release layer formed on the barrier layer. A non-stick layer is on the paper layer on the side opposite the barrier layer. The sheet-like products include the release layer with a heavy tacky material on the release layer of the substrate. The release liner or substrate is releasable from the tacky layer.

BACKGROUND OF THE INVENTION

In products which have a sticky or tacky material on a substrate web, where the sticky or tacky material is applied to or made on the substrate web and then during use is removed from the substrate web, there has been a problem in manufacturing the product on the substrate web. After the tacky material is deposited or made on the web substrate and when the web product is completed, it often is either stacked or rolled into a roll for shipment and later use. The sticky material should not stick to the underside of the web when it is stacked or rolled. The problem is particularly acute in the manufacture of roofing materials which include a layer of tacky bituminous material.

In known methods of manufacturing methods of roofing materials, bituminous material has been applied on a web which may be or forms a part of the release liner. The application of the bituminous material forms a bituminous layer on a release substrate or liner. The release liner comprises a paper layer, a barrier layer, and a release layer. The bituminous material is applied to and is in contact with the release layer of the substrate. Hence, the bituminous material can be released from the substrate when it is mounted on a roof. The bituminous layer generally has been covered with a plastic film layer in such a manner that only a narrow area at the both edges of the bituminous layer is uncovered. The web has been wider than the width of the bituminous layer. This permits the edges of the web to be folded or turned backwards to face the edge area of the bituminous material layer. The folded edges help alleviate the bituminous layer from sticking to other sheets of the same material which have been piled one on the other. The plastic film over the bituminous layer and folded edges also permit the bituminous covered web to be in a roll form with the edges of the of the bituminous layer being protected by the folded edges of the web. However, this kind of solution requires excess material and an excess stage in manufacturing where the edges are turned or folded over. Furthermore, the web product is difficult to handle when the release liner is detached at the release layer from the bituminous layer for application of the bituminous layer to a roof.

SUMMARY OF THE INVENTION

The present invention is directed to a sheet-like product, a releasable liner or substrate which forms a part of the sheet-like product, and a method for manufacturing the releaseable substrate. The sheet-like products have a tacky layer, such as a bituminous material, which is applied to or is made on a releasable substrate. Thereafter the tacky layer is removed from the substrate when the product is put in use. Such products may include materials, which are laid on the substrate in a fluid state, and then cooled or dried in such a way that the product becomes solid, such as the bituminous material used in roofing. In the latter case of making roofing materials, the multi-layered release liner has to be strong and sufficiently durable to withstand the weight of the bituminous material, but also the rigors of the application of molten bitumen and cooling thereof to make the roofing material. Further, products of the invention may be products, which have an adhesive layer as an outer functional layer, i.e. the adhesive layer is the outermost one when the substrate is removed. An example of those products is a web from which bandages are made. In these products, the adhesive layer is applied first on the substrate, and other layers are formed in situ or ready layers are attached on the adhesive layer The defects of the prior art are overcome by the invention which includes a release liner which has a paper layer having a first surface and a second surface, a barrier layer formed on the first surface of the paper layer, a release layer on the surface of the barrier layer opposite the paper layer, and a non-stick layer on the second surface of the paper layer. In an important aspect the paper layer comprises a kraft paper having a grammage between 30 and 150 $g/m^2$. The barrier layer formed on the first surface of the paper layer comprises a polymeric film having a grammage between 10 and 30 $g/m^2$. The release layer on the barrier layer on the release layer comprises a cured solvent-free silicone having a grammage between 0.5 to 1.5 $g/m^2$. The non-stick layer on the second surface of the paper layer has a grammage from 0.3 to 3.0 $g/m^2$, preferably 0.2 to 2.0 $g/m^2$ and most preferably 0.5 to 2.0 $g/m^2$ and is quickly cured by ultraviolet radiation.

The method of manufacturing is characterized in that a non-stick layer is formed on a second surface of the paper layer on the same production line as the release layer to permit the release liner to be made in a continuous process. In the method for making the release liner, a polymeric barrier film layer is continuously formed on the paper web having the first and second surface and a grammage between 30 and 150 $g/m^2$. The barrier film layer is formed on the first surface of the paper web. A curable release composition is applied on the polymeric barrier film layer. Thereafter the curable release composition on the barrier film layer is continuously cured to form a release layer on the polymeric barrier film. A non-stick layer is continuously applied to the second surface of the paper web before applying the curable release composition or after curing the curable release composition. The non-stick composition is continuously cured to form the multi-layered release liner. The continuous manufacture of the release liner is such that the paper and barrier layer do not have to be rolled and unrolled prior to the application of the non-stick layer.

The method of rebuilding the manufacturing line is characterized in that a siliconizing unit and an ultraviolet curing unit for forming a non-stick layer on the second surface of the paper layer are fit on the same production line as the means for forming the release layer. A quick UV curing silicone non-stick composition for the non-stick layer permits application of the non-stick layer on the same production as the application of the release layer.

When the non-stick layer is on the reverse side of the release paper, the turning of the edges is avoided in the bituminous roofing product, and the release paper can be substantially equal in width to the layer applied on the release layer (for other reasons it is possible that the release paper is wider than the product formed on it). When the non-stick layer is formed on the same production line as the release layer the manufacturing process is very cost-effective. There is no need for a new production line, but the required devices can be fit into the old production line.

After the existing production line is revised, it includes a means for forming a barrier layer on the first surface of the paper layer, and means for forming a release layer on a barrier layer and forming a quick curing non-stick layer on the paper layer on the side opposite the barrier layer.

DETAILED DESCRIPTION

Figure 1:
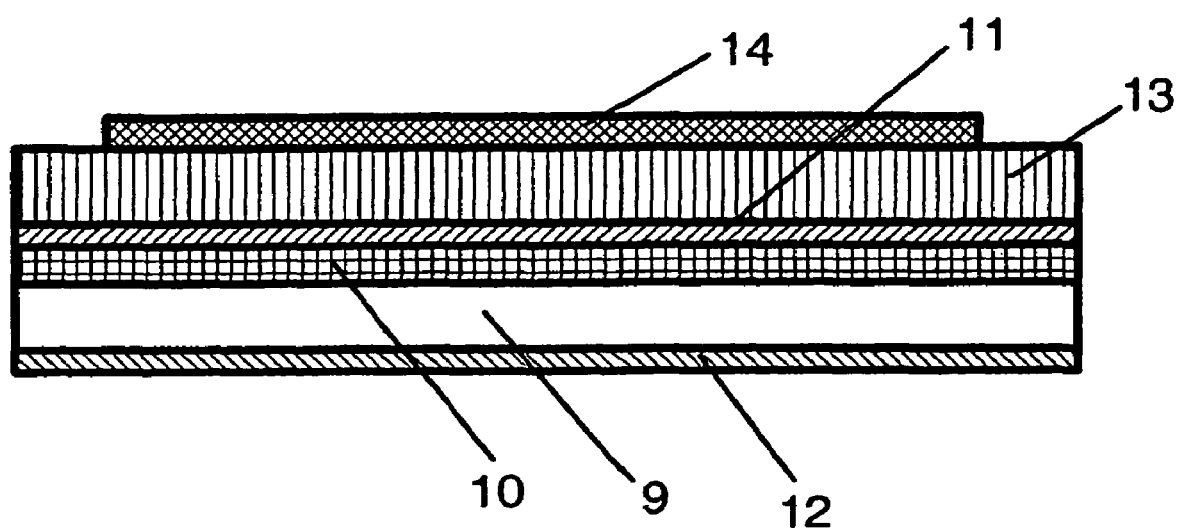
FIG. 1 is a cross-section of the release paper of the invention and layers, which can be formed on it.
Figure 2:
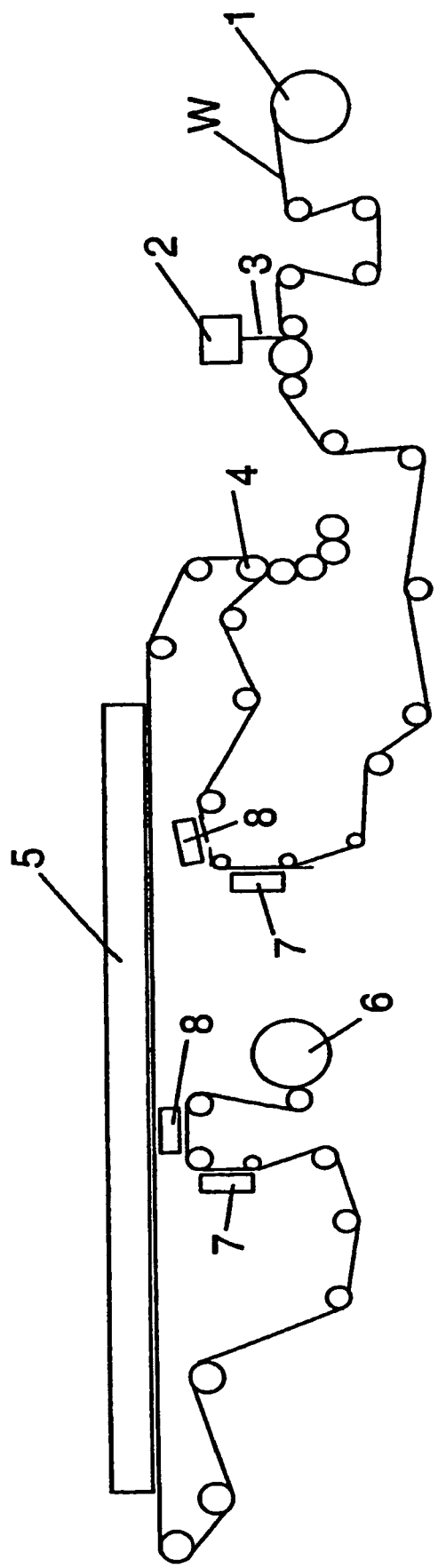
FIG. 2 shows schematically the production line of the invention.

The base paper of the multi-layered release liner of the invention is preferably a paper made by a sulphate cellulose process, and its grammage varies between 30 and 150 g/m$^2$. The barrier layer may be a plastic layer comprising polyolefins, such as polyethylene film or polypropylene film. The barrier layer is preferably extruded on the base paper. The grammage of the barrier layer is preferably between 10 and 30 g/m$^2$. Other possibilities are to use glassine paper as a base paper, or coat the kraft-paper by a paste comprising mineral particles. The purpose of the barrier layer is to form a substantially impermeable and smooth layer on the paper to prevent fluid materials to penetrate into the base paper. The release layer formed on the barrier layer is a silicone-based layer having a grammage between 0.5 and 1.5 g/m$^2$. The layer is solvent-free, solvent based, or emulsion, and curable by heat or radiation.

The non-stick layer is also formed of silicone but it is curable by radiation, such as ultraviolet radiation. The grammage of the non-stick layer is between 0.3 and 3.0 g/m$^2$, the preferred range is between 0.5 and 1.5 to 2 g/m$^2$. The releasing capability of the non-stick layer is not necessarily as good as that of the release layer, but it is high enough to keep adjacent layers detached. In addition to the continuous non-stick layer, also discontinuous non-stick layers such as a "stripe" at the edges of the paper going in the machine direction can be formed. This permits the non-stick "stripe" area to face the bitumen when the roofing material is rolled such at the film 14 and non-stick layer guard the bitumen layer from sticking to itself.

In the production line, the base paper in a web form is unwound from a roll and conveyed to an extruder. The extruder is arranged to form the barrier layer. In the next step, the release layer is formed on the barrier layer in a first siliconizing unit, and the formed layer is cured by heat.

To form the non-stick layer, some arrangements are required. Because a new production line requires great investments and it is unreasonable to make the non-stick layer on another production line than the other layers formed on the base paper, it is preferable to fit the needed devices into the old production line. The space in the existing production line is typically limited, and therefore a process step to be fit into the production line shall be short. A solution for this is to use a radiation curable silicone, which requires a second siliconizing unit in which the release layer is applied onto the base paper, and a radiation curing unit, such as an ultraviolet curing unit. There are two possibilities to insert the devices, namely between the extruder and the first siliconizing unit, or after the first siliconizing unit. The two possibilities are of course alternatives to each other. The second siliconizing unit can be for example a flexographic printing unit.

In the following, the invention will be described by means of examples.

EXAMPLE

A release paper, which was intended for a manufacturing substrate of a bituminous material was manufactured. According to FIG. 1, the release paper comprises a substrate 9, a barrier layer 10, a release layer 11, and a non-stick layer 12. The substrate 9 is a paper layer, and the barrier layer is a plastic layer, such as a polyolefin layer. The release layer 11 comprises a layer formed of a solvent-free silicone, and the non-stick layer 12 comprises a layer formed of an ultraviolet curing silicone. The non-stick layer 12 can cover the substrate 9 totally, or partially. The non-stick layer 12 may be formed of stripes covering suitable locations, such as the edge areas of the manufacturing substrate.

The release paper can be used for example as a manufacturing substrate for a bituminous material, for example a roofing material, such as a roof-covering sheeting. The release paper is fed to a production line, and a fluid hot bituminous material is applied on the release paper. The amount of the bituminous material is approximately 1 kg/m$^2$. The bituminous material cools on the release paper forming a sheet-like product. The bituminous material may be coated by a plastic film, such as a polyethylene film. The plastic film having a grammage of about 50 g/m$^2$ protects the sticky bituminous surface and makes it easier to handle. The bituminous material is referred to by a number 13 in FIG. 1, and the polyethylene film is referred to by a number 14. Normally the bituminous layer 13 has edge areas, which are not covered by the film 14 because the edge areas attach bituminous material products to each other.

The base paper of the release paper was a kraft paper having a grammage of 95 g/m$^2$. A web W consisting of the base paper was unwound from a roll 1. The Bendtsen roughness of the base paper was 300 ml/min. The web W was led to an extrusion coating unit 2, and a film 3 comprising high density polyethylene was extruded on the web W. The film had a grammage of 19 g/m$^2$. Next, the film coated side of the web W was treated in a siliconizing unit 4 to form a silicone layer having a grammage of 1 g/m$^2$. The silicone layer comprised solvent-free silicone, which was cured in a curing unit 5. After curing, the web W was wound to a roll 6.

Another siliconizing unit to make a siliconized layer on the reverse side of the web W should be added to the described production line. There were two possibilities to do it, namely before the siliconizing unit 4, or after the curing unit 5. The new siliconizing unit 7 was followed by a curing unit 8 in both cases. In either case, the non-stick layer is applied in a continuous line without rerolling prior to the application of the release layer.

To make the new devices, siliconizing unit 7 and the curing unit 8, to fit into the old production line some things had to be taken into account. The free space in the production line was limited, and therefore the used technique had to be adjusted to meet the space requirements. The solution was to use a silicone that could be cured by an ultraviolet radiation. The curing time needed was only 0.1 seconds compared to 3 seconds needed by a thermal curing silicone. When the production speed was 300 m/min only 1 meter was required for the ultraviolet curing.

Tests were carried out to measure releasing forces. By using Finat FTM 10 method and Tesa 4651 adhesive, 50 N/m was achieved for the surface having the non-stick layer 12, and under 5 N/m was achieved for the surface having the release layer 11.

The invention is not restricted to the description above, but the invention may vary within the scope of the claims.

What is claimed is:

1. A roofing product including a roll of material, the product comprising:
    a paper layer having a grammage between 30 and 150 g/m$^2$ and having a first surface and a second surface;
    a barrier layer formed on the first surface of the paper layer, the barrier layer comprising a polymeric film having a grammage between 10 and 30 g/m$^2$;
    a release layer on the barrier layer, the release layer comprising a cured solvent-free silicone, and having a grammage between 0.5 and 1.5 g/m$^2$;
    a layer of bituminous material on the release layer;
    a plastic film layer partially covering the bituminous material; and,
    a discontinuous non-stick cured silicone layer partially covering the second surface of the paper layer and arrayed as stripes on edge areas of the second surface of the paper layer, the non-stick layer having a grammage from 0.3 to 3.0 g/m$^2$.

2. The roofing product according to claim 1, wherein the barrier layer comprises a sheet of polyolefin film.

3. The roofing product according to claim 1, wherein the paper layer is kraft paper.

4. The roofing product according to claim 1, wherein the barrier layer comprises polyethylene having a grammage between 10 and 30 g/m$^2$.

5. The roofing product according to claim 4, wherein the polyethylene grammage is about 19 g/m$^2$.

6. The roofing product according to claim 1 wherein the release layer grammage is about 1 g/m$^2$.

7. The roofing product according to claim 1, wherein the non-stick layer comprises an ultraviolet cured silicone.

8. The roofing product according to claim 1, wherein the non-stick layer grammage is about 1 g/m$^2$.

9. The roof-covering sheeting material according to claim 1, wherein the non-stick layer comprises an ultraviolet cured silicone applied in a machine direction to the second surface of the paper layer.

10. A roofing product including a roll of material, the product comprising:
    a paper layer comprising kraft paper having a first surface and a second surface;
    a barrier layer formed on the first surface of the paper layer, the barrier layer comprising a polymeric film;
    a release layer on the barrier layer, the release layer comprising a cured solvent-free silicone, wherein the paper layer, the barrier layer and the release layer form a release liner;
    a layer of bituminous material formed on the release liner;
    a plastic film layer partially covering the bituminous material opposite the release liner; and
    a discontinuous non-stick cured silicone layer partially covering the second surface of the paper layer and arrayed as stripes on edge areas of the second surface of the paper layer.

11. The roofing product according to claim 10, wherein the paper layer is a kraft paper having a grammage between 30 and 150 g/m$^2$.

12. The roofing product according to claim 10, wherein the barrier layer comprises a polymeric film having a grammage between 10 and 30 g/m$^2$.

13. The roofing product according to claim 10, wherein the release layer comprises a cured solvent-free silicone having a grammage between 0.5 and 1.5 g/m$^2$.

14. The roofing product according to claim 10, wherein the non-stick layer comprises a cured silicone having a grammage from 0.3 to 3.0 g/m$^2$.

\* \* \* \* \*